H. B. GREIG.
LATHE.
APPLICATION FILED JULY 23, 1906.
958,631.
Patented May 17, 1910.
4 SHEETS—SHEET 2.
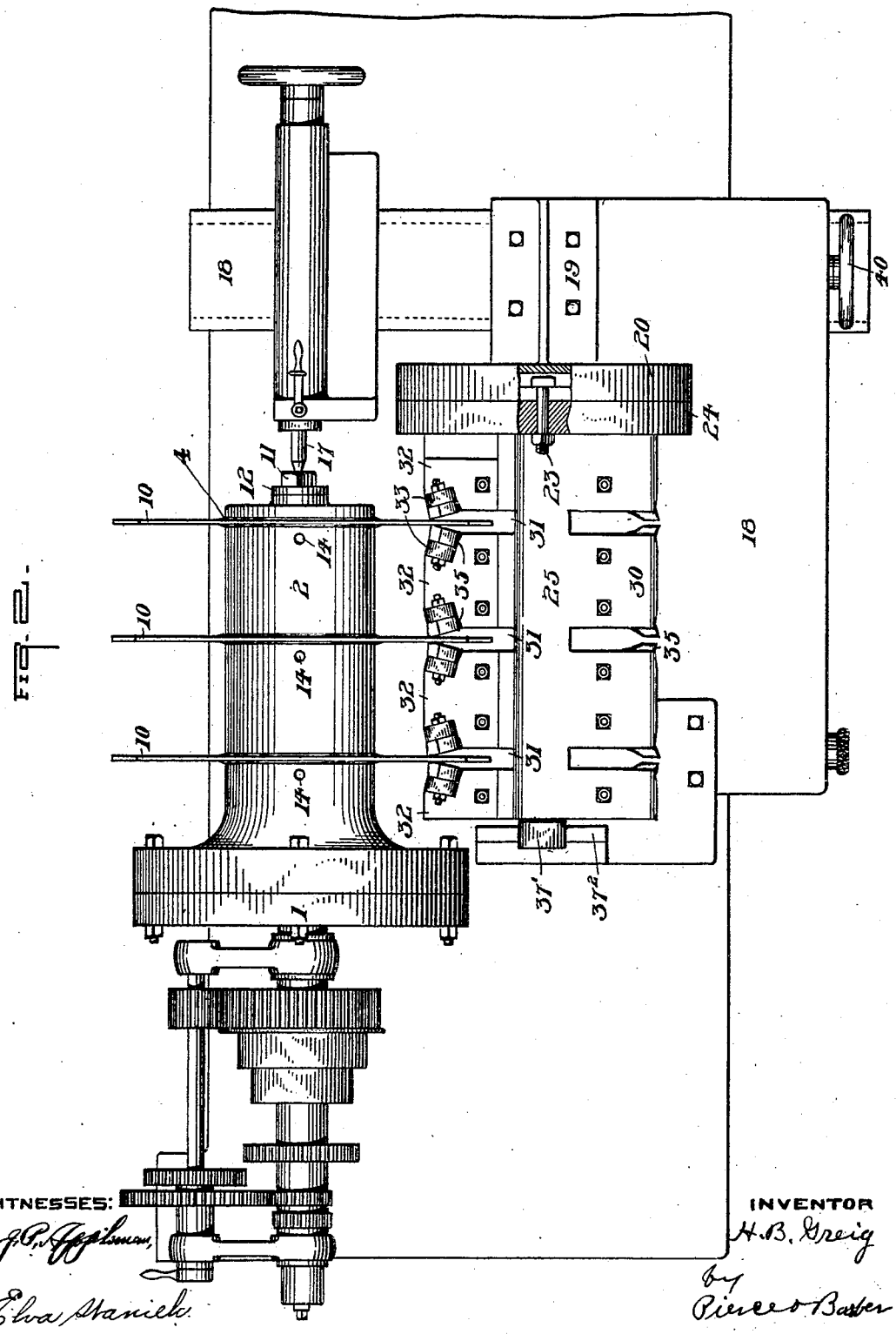

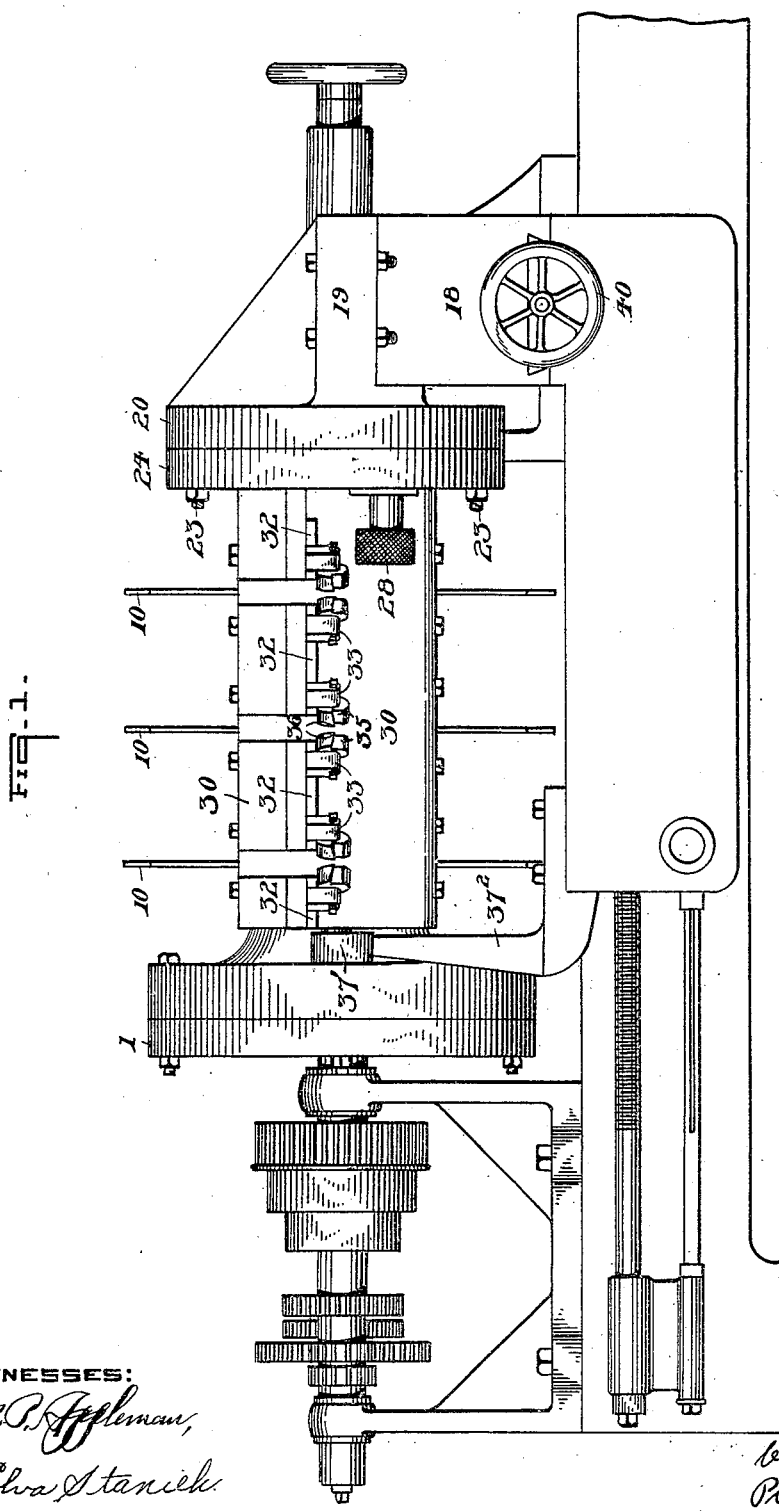

H. B. GREIG.
LATHE.
APPLICATION FILED JULY 23, 1906.
958,631.
Patented May 17, 1910.
4 SHEETS—SHEET 3.
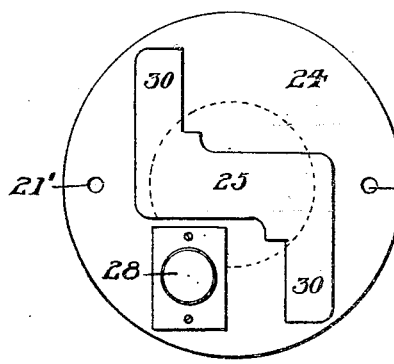
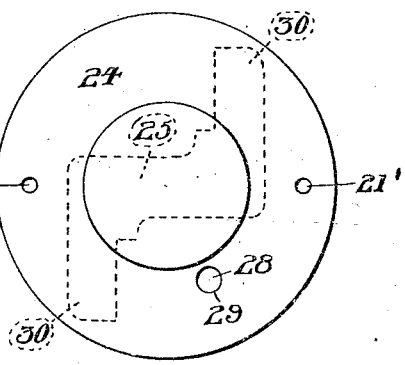
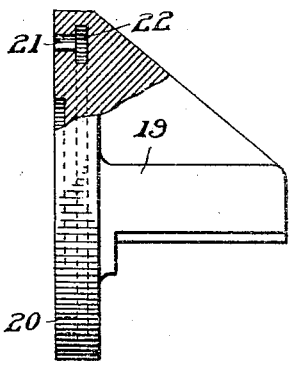
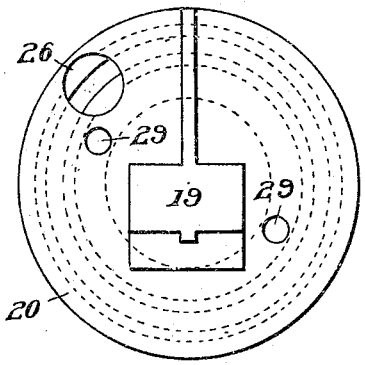
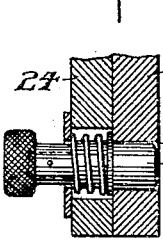
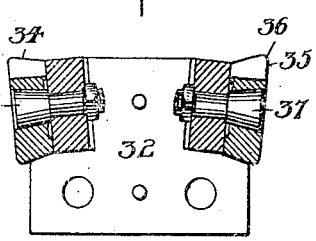
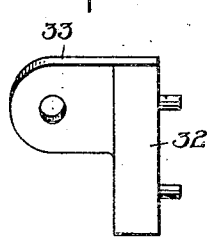
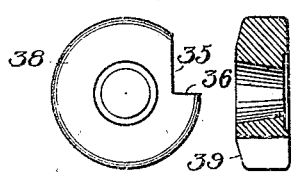
WITNESSES:
INVENTOR
H. B. Greig
by Pierce & Barber
ATTORNEYS

H. B. GREIG.
LATHE.
APPLICATION FILED JULY 23, 1906.

958,631.

Patented May 17, 1910.
4 SHEETS—SHEET 4.

WITNESSES:
J. P. Heleman
Elva Stanick

INVENTOR
H. B. Greig
by
Pierce & Barber
ATTORNEYS

UNITED STATES PATENT OFFICE.

HARRY B. GREIG, OF CLEVELAND, OHIO.

LATHE.

958,631.  Specification of Letters Patent.  Patented May 17, 1910.

Application filed July 23, 1906. Serial No. 327,283.

*To all whom it may concern:*

Be it known that I, HARRY B. GREIG, a citizen of the United States, residing at Cleveland, in the county of Cuyahoga and State of Ohio, have invented or discovered new and useful Improvements in Lathes, of which the following is a specification.

My invention relates broadly to lathes but more particularly to machines for turning plates so that their opposite faces shall be plane and parallel.

Heretofore it has been the practice to finish the surfaces of a plate as follows: The plate was secured to the face-plate of a lathe and finished on one side by suitable cutters; it was then removed and again secured to the face-plate but with the unfinished side exposed, which was then finished in the same manner as the first side was. This method, besides being very slow, is not accurate, as the chucking, or securing, of the plate to the face-plate often caused the plate, if it was dished or bent in any way, to spring so as to lie flat on the face-plate of the lathe; as soon as the plate was removed from the lathe, its resiliency would cause the plate to assume more or less closely its former dished or bent shape. Furthermore, as the cutting was done on one face only of the plate at a time, the cutting tool would cause outwardly projecting parts of the plate to spring while the tool was working on this portion; but as soon as this portion had passed the tool it would spring out again. Thus it is seen that perfect work was not possible with the method just described. Dished or bent plates had to be chucked, cut, and reversed several times before they were finished, and even then they did not have perfectly parallel plane faces.

With my improved apparatus, I am enabled to turn several plates simultaneously on both sides so that both faces of each plate will be plane and parallel. This I can do in as short a period as fifteen minutes, where by the old method described, it frequently took hours to finish one plate. I have shown my lathe as capable of treating three plates simultaneously, but it can be arranged to treat a larger or smaller number.

Figure 7:
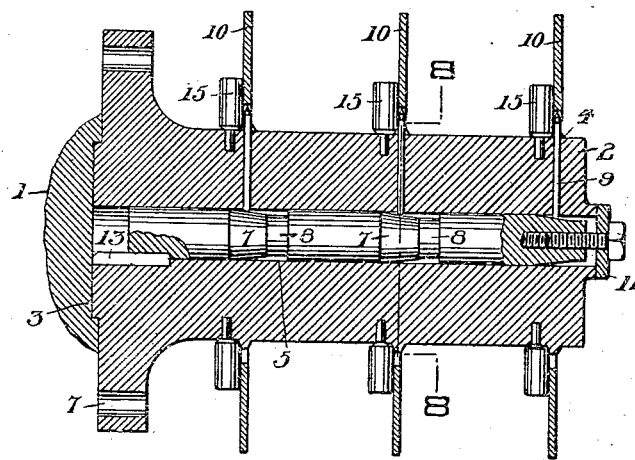
Figure 13:
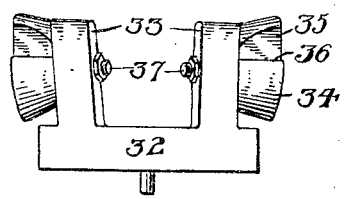
Figure 8:
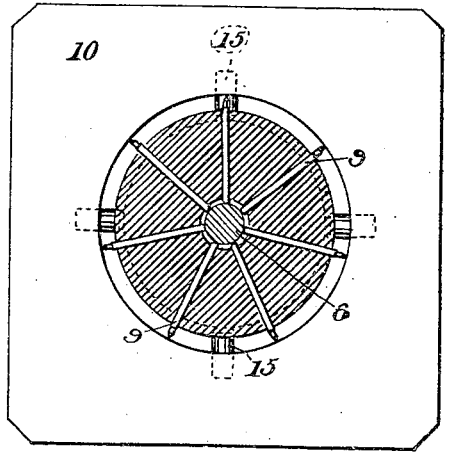
Figure 9:
Figure 10:
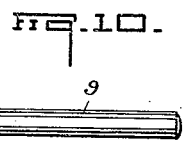
Figure 11:
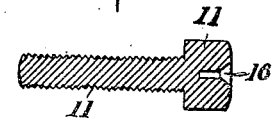
Figure 12:
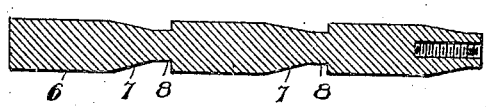

Referring to the drawings which form a part of this specification, Figure 1 is a side elevation of a lathe fitted with one form of my invention; Fig. 2, a plan thereof; Fig. 3, an end elevation of the tool-holder support; Fig. 4, an end elevation of the tool-holder support, looking in the opposite direction from Fig. 3; Fig. 5, a side elevation, partly in section, showing the tool-rest head and a fragment of the tool-holder support; Fig. 6, an end view of Fig. 5 looking to the left; Fig. 7, a longitudinal section through the mandrel and three plates thereon, showing the manner of securing and adjusting the plates; Fig. 8, a section on the line 8—8 of Fig. 7; Fig. 9, a side view of one of the gage-pins; Fig. 10, a side view of one of the mandrel-pins; Fig. 11, a longitudinal section of the screw which operates the mandrel for actuating the mandrel pins and receives the tail-stock of the lathe; Fig. 12, a longitudinal section of the mandrel-plunger; Fig. 13, a section showing the manner of stopping the tool-holder support at the required positions; Fig. 14, a plan of a tool-holder, with the roughing cutters and their supporting lugs in section; Fig. 15, a side elevation of one of the tool-holders; Fig. 16, a face view of one of the cutters; Fig. 17, a cross-section of one of the finishing cutters; and Fig. 18, an end view of one of the cutter-holders with two cutters thereon, showing the tilting of the cutters in the vertical direction.

On the drawings, 1 represents the usual face-plate of an engine lathe. To this face-plate I secure the hollow casting 2, which I term the mandrel. It has the boss 3 fitting in an opening in the face-plate to hold the mandrel axially in alinement with the center of the lathe spindle. The mandrel is provided with a number of annular ribs 4 equal to the number of plates to be turned simultaneously. Extending axially through the mandrel is the opening 5, in which slidingly fits the plunger or mandrel-pin actuator 6, having the annular recesses with the inclined or tapered portions 7 terminating at their inner ends in the untapered portions 8.

Extending radially from the opening 5 are a number of openings which have their outer ends at the peripheries of the ribs 4, and in these openings are the slidable mandrel-pins 9, having their outer ends sharp-pointed, so as to enter the edge of the metal around the central openings of the plates 10 (which are the plates to be turned), when the inclines 7 on the plunger force the pins outwardly. The plunger is drawn outwardly by the cap-screw 11, which is threaded in the outer end of the plunger and bears against the washer 12 on the end of the mandrel. The plunger is prevented from independent rotation by the key 13 in both the mandrel and the plunger.

The mandrel is provided at the rear of each rib 4 with the holes 14, into which the stop-pins 15 are placed, the holes being so placed and the stop-pins having such a diameter that, when the plates 10 are resting against the stop-pins, the points of the mandrel-pins 9 will be opposite the center of the edge of the metal around the openings in the plates. The rear row of holes 14 is first provided with the stop-pins 15 and the first plate 10 is slid over the mandrel until it rests squarely against the stop-pins, when it will be centrally over the rear rib 4; the next row of holes 14 is next provided with their stop-pins and the second plate 10 is slid up against the stop-pins; the third plate is similarly placed on the mandrel, it being understood, of course, that the plunger is retracted and that the mandrel-pins 9 are retracted so as to have their points out of the path of the plates, and that the inner ends of the mandrel-pins are in the deeper portions of the annular recesses in the plunger. The screw 11 is then turned to draw the plunger outwardly, whereby the inclines 7 force the mandrel-pins 9 out into engagement with the plates, as already explained, so that the plates will rotate with the mandrel while the cutting tools are working on both faces thereof. The stop-pins should be removed before the turning begins, as they lie in the paths of the cutting-tools. The head of the screw 11 has the conical opening 16 to receive the tapered end of the usual tail-stock or lathe center 17.

The lathe-bed is provided with the usual lathe-tool rest 18 for feeding the tools transversely of the axis of rotation of the mandrel. The rest 18 supports the tool-rest head 19, which has the plate 20, provided with the annular slot 21, having the wider rear extension 22 to retain the heads of the screws 23 which extend through the slot 21 and through holes 21' in the flange 24 of the tool-holder support 25. The rear of the flange 20 is provided with the hole 26, through which the bolts 23 may be passed into the slot 21. The flange 24 fits against the face of the plate 20, as shown in Fig. 1. The support 25 may be rotated on the flange head 19 after the nuts on the bolts have been loosened, the heads of the bolt sliding in the slot extension 22.

The flange 24 is provided with a spring-actuated pin 28, which alternately enters the diametrically opposite holes 29 in the flange 20 to stop the rotation of the tool-holder support 25 at the proper positions for the roughing and the finishing cutters to do their work.

The tool-holder support 25 extends from its flange 24 parallel to the mandrel and has the parallel flanges 30 extending in opposite directions and including planes at opposite sides of the axis of the support. Each flange is provided with the slots 31 which lie opposite the ribs 4 and the plates 10.

Secured to the flanges 30 are the tool-holders 32, which are flat castings having thereon the ears or lugs 33, one at each side of each slot 31, the flanges and the tool-holders being bolted together. Considering the flanges 30 horizontal, the lugs 33 are inclined about four degrees in a horizontal direction and about seven degrees in a vertical direction.

The cutters 34 are simply circular pieces of hardened steel of uniform dimensions around the same, except that the notch 35 is cut out leaving the tooth or cutting corner 36. The bottom of the notch may be ground to sharpen the tool, as shown by the dotted lines in Fig. 16. The cutters are secured to the lugs 33 by means of the stud-bolts 37, which permit the cutters to be set at any desired position axially, so that, as the notch is deepened by each sharpening operation, the cutting corner or edge may always be adjusted to the same position relative to the support 25. The back of the cutters is preferably recessed as shown to increase their frictional grip on the lugs when the nuts are turned up tight on the bolts 37.

In order to support the free end of the tool-holder support 25, I have provided this end with the antifriction roller 37' which rests on the upper end of the bracket 37² secured to an extension of the rest 18.

38 represents one of the finishing cutters, which differs from a roughing cutter 34 in having its face inclined or beveled so as to be slightly thinner at its outer edge. The cutters are notched so as to give clearance between them and the plates. The parts cut away are those which would prevent the cutting edges from engaging the plates, if the cutters were perfect disks.

It will be readily seen that by inclining the notched cutters in the two directions as described, the cutting edges of two coöperating cutters are the portions of the cutters which are the closest together. It will also be seen that, when the faces of the cutters are at right angles to their axes, the corners or outer angles only of the cutters attack the plates 10. They produce a deep narrow cut and are called the roughing cutters. When the cutters are beveled as shown on Fig. 17, the inclining thereof as described will cause the whole of the inclines 39 to engage the plates, producing a broad, shallow, and comparatively smooth cut.

The plates 10 being secured to the mandrel as described, and the support 25 having been rotated and secured so as to present the roughing cutters opposite the plates, the lathe is set in motion, so as to rotate the plates toward the observer looking at Figs.

1 and 2. The rest 18 at the same time moves toward the center of the lathe bed, causing the cutters to move toward the plates 10. Each plate is simultaneously engaged by a cutter on each face thereof. As soon as the cutters reach the central openings in the plates 10, the rest 18 is moved back to its starting position by the usual hand-wheel 40; the nuts on the bolts 23 are loosened; the spring-pin 28 is withdrawn from the hole 29. The tool-holder support is now released and turned 180°, when the spring-pin 28 enters the other hole 29. The nuts on the bolts 23 are then tightened and the lathe again started. The finishing cutters now stand in front of the plates 10. The lathe being again set in motion, the operation is the same as when the roughing cutters were in use.

After the finishing cutters have completed their work and the rest 18 has been retired to its original position, the center 17 is withdrawn from the head of the bolt 11; the bolt is turned partly out of the plunger 6; and the plunger pushed farther into the mandrel allowing the holding pins 9 (Fig. 8) to recede from the plates. The mandrel-pins are then pushed back into the mandrel by pressure on the plates. The plates may then be removed and fresh ones put on the mandrel for another operation of the lathe.

Realizing that many changes can be made in the elements and their combinations, I do not desire to be limited to the precise elements and combinations shown and described.

I claim—

1. In a lathe, a mandrel shaped so as to have sleeved thereon a plurality of plates with a central opening, a series of sets of expansive devices carried by the mandrel, there being one set for each plate on the mandrel, means for simultaneously causing one set of said devices to engage the walls of the opening in each plate, and a lathe tool arranged to move parallel with each plate and plane one or both faces thereof.

2. In a lathe, a mandrel shaped so as to have sleeved thereon a plurality of plates with central openings, a series of expansive devices carried by the mandrel, there being one series for each plate on the mandrel, a single means for simultaneously causing said devices to engage the walls of the openings in said plates, and lathe tools arranged to move parallel with the plates and plane one or both faces thereof.

3. In a lathe, a mandrel having an axial opening, a plunger therein having a plurality of inclines thereon, a circular series of mandrel-pins arranged around each incline and extending from said central opening to the exterior of the mandrel, their inner ends arranged to be engaged by said inclines so as to be forced outwardly thereby, in combination with cutters arranged to cut simultaneously the sides of blanks held by several series of mandrel-pins.

4. In a lathe, a mandrel shaped to receive thereon a plate having a central opening, expansive devices carried by the mandrel and adapted to be forced to engage the edge of the said opening, and removable gaging means with which one face of the plate is engageable in the path of the cutters to adjust the plate accurately around the said expansive devices, in combination with cutters arranged to cut simultaneously the sides of the said plate.

Signed at Cleveland, Ohio, this 16th day of July, A. D. 1906.

HARRY B. GREIG.

Witnesses:
C. W. COMSTOCK,
A. C. EASTWOOD.